United States Patent Office 3,235,414
Patented Feb. 15, 1966

3,235,414
ORGANIC FLUX FOR SOLDERING
Burton S. Marks, Dolton, Ill., assignor to Continental Can Company, Inc., New York, N.Y., a corporation of New York
No Drawing. Filed Jan. 11, 1962, Ser. No. 165,674
6 Claims. (Cl. 148—23)

This invention relates to a flux for use during soldering of tin plate and like metal bodies.

It is known to employ rosin and heat-decomposed salts such as zinc and ammonium chlorides during soldering, with the function of preparing the metal surface for firm bonding of the molten solder. In practice, rosin fluxes decompose at the soldering temperature and leave an unsightly dark deposit. The chloride fluxes are so strongly acidic at the soldering temperature that the action extends beyond the region to be soldered and can continue after the cooling.

An object of the instant invention is the provision of a solder flux which is of organic type and is essentially free of decomposition at the soldering temperature.

Another object is the provision of an organic fluxing composition which is competent of chelating action with tin compounds.

Another object is the provision of an organic fluxing composition of acidic but not oxidizing nature, which does not significantly decompose at soldering temperature, and which does not leave a toxic residue after the soldering operation.

The 98:2 solder employed with tin plate, as in the making of food containers from tin plate, melts at about 320 degrees C. Fluxes of the instant type withstand heating to such temperature without significant decomposition and are non-boiling liquids at such temperature and are effective for removing tin oxide at such temperature. Stannous oxide (SnO) is amphoteric, but is somewhat more basic than acidic in its chemical functioning. As a base, it can react with various non-oxidizing acids to form corresponding stannous salts which are soluble in the liquid parent acid.

It has been found that the compounds set out below have the desired properties and also that they are effective to "wet" the metal surface and thereby maintain a film thereon by which the molten solder can come in contact with clean metal for providing a satisfactory bond.

It has been found that trimellitic acid provides good fluxing agents which are molten at about 320 degrees C., have essentially no oxidizing effects to attack the metal surface but wet the same, and are effective to displace and remove surface contaminants such as tin oxides and chromates, as well as the lubricant residues. The acid may be used as such or as the anhydride, noting that it begins to form a liquid anhydride at about 216 degrees C.

(A1) → (A2) + H₂O

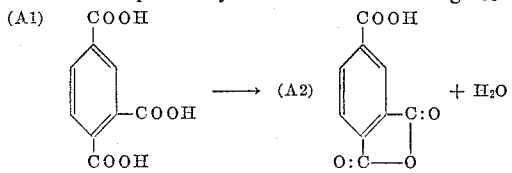

Likewise esters of trimellitic acid, prepared from the anhydride by refluxing with the desired alcohol, have been found effective. The monoesters of trimellitic acid may be represented as a mixture of (A3) + (A4)

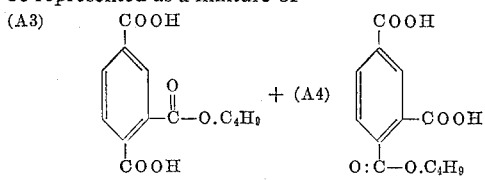

In general, the esters of aliphatic alcohols of 2 to 6 carbon atoms have been employed, such as butyl monoester, and the complexes from reaction of trimellitic anhydride with glycols to form di-esters, with the glycol having 2 to 4 carbon atoms in chain and permissive side hydrocarbon branches such as in ethylene glycol and diethylene glycol. Such a di-ester may be represented as (A5) (A6) (A7)

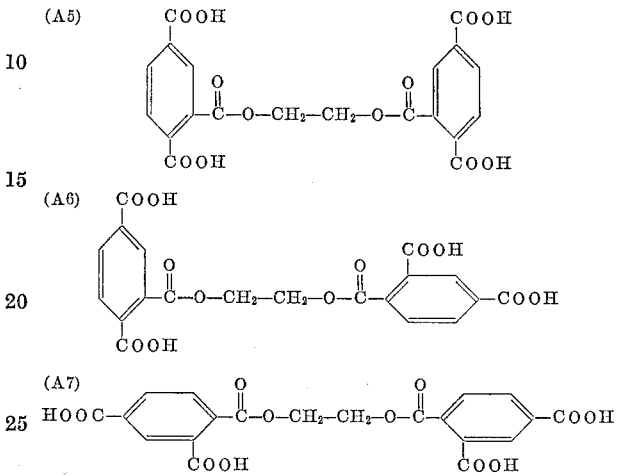

Saturated aliphatic polycarboxylic acids and their anhydrides are successful, including sebacic and azelaic acids and commercial polysebacic anhydride. Such may have linear or branched structure. 2-ethylsuberic, 2,5-diethyladipic, and commercial mixed iso-sebacic acids are examples or useful iso-sebacic acids. Such compounds can be defined as having 9 to 10 carbon atoms, including at least two carboxyl groups, and inclusive of carbon atoms in permissive hydrocarbon branches. Such compounds can be represented as:

(B1) n-sebacic acid:

$$HOOC \cdot (CH_2)_8 \cdot COOH$$

(B2) 2-ethyl suberic acid:

$$HOOC-CH-(CH_2)_5 \cdot COOH$$
$$\hspace{1.5cm} | $$
$$\hspace{1.5cm} C_2H_5$$

(B3) 2,5-diethyl adipic acid:

$$HOOC \cdot CH \ (CH_2)_2 CH \cdot COOH$$
$$\hspace{1cm} | \hspace{2cm} |$$
$$\hspace{1cm} C_2H_5 \hspace{1cm} C_2H_5$$

(B4) Azelaic acid:

$$HOOC \cdot (CH_2)_7 \cdot COOH$$

(B5) Polysebacic anhydride:

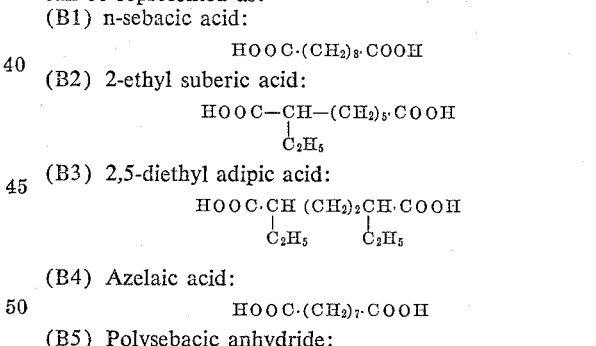

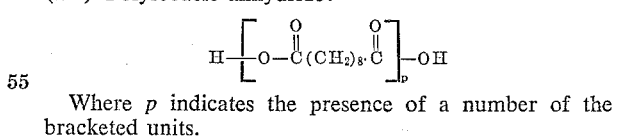

Where $p$ indicates the presence of a number of the bracketed units.

In each of these aliphatic acids and anhydrides, the carboxyl groups are separated by chains of at least 4 carbon atoms. Upon heating such acid compounds, there is no substantial amount of cyclic or mono-anhydride formed, but two or more acid molecules can combine as so-called linear polyanhydrides. When the carboxyl groups are separated by 3 or less carbon atoms, heating can cause the formation of mono-anhydride from a single acid molecule, with a cyclic or ring structure of 6 or less members: and it is presently preferred to avoid the presence of such cyclic anhydrides. These acids and anhydrides consist of carbon, hydrogen and oxygen.

Aromatic acidic compounds can be employed, such as di-nuclear phenols, in which the nuclei are connected through a carbonyl group, particularly with at least one phenolic hydroxyl group in an ortho position relative to the point of attachment of the carbonyl group to the ring, including:

(C1)
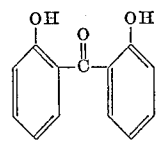
2,2'-dihydroxybenzophenone (C2)
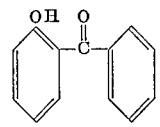
2-hydroxybenzophenone (C3)
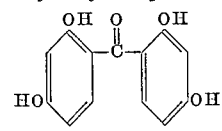
2,2',4,4'-tetrahydroxybenzophenone (C4)
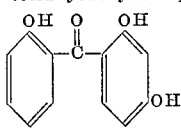
2,2',4-trihydroxybenzophenone Each of the named acidic compounds, being polybasic acids or anhydrides or esters, or dinuclear compounds connected through a single carbonyl group, are liquid at 320 degrees C., wet the metal, are effective to displace and remove surface impurities by acidic and chelating action without forming toxic residues, and do not significantly carbonize at such temperature.

The compounds have been successfully employed as fluxes under can-line conditions where the flux was applied to the container hook areas, and the container body preheated to 320 degrees F. for a few seconds prior to solder application; and in which soldering rolls were employed to take the solder from a pot having a temperature of 680 to 700 degrees F., and deliver the solder to the body seam. Practice with solder of 98:2 ratio of lead: tin, and a melting point above 600 degrees F., has been successful. Such solders have advantage in can making, in that they resist creep or cold flow better in the packed can during processing or incidental to internal pressures, e.g., in packaging beer: as compared to the effects of solders having higher tin contents. The instant fluxes are found to give excellent solder filling of the lap and hook areas, lap filleting with coverage of the cut edge of the metal, and hook area filleting at the inside of the container. This hook area filleting can be made more even or smooth by incorporating mono-ethanolamine hydrochloride in the flux, in an amount of to 50 percent by weight of the acidic component. When present, it is preferred to employ at least 2 percent by such weight, to assure smooth filleting.

It is preferred to employ the acidic material as a solution in a volatile organic solvent. Such a formulation can be

|   | Parts by weight |
|---|---|
| Dimethylformamide | 75 |
| Sebacic acid | 25 |
| Mono-ethanolamine hydrochloride | 1.2 | in which the ethanolamine salt is about 5 percent of the weight of the acidic component.

The selected solvent should completely dissolve the ingredients to a homogeneous solution. In general polar solvents are desirable to assure solution of the ethanolamine salt, and the general chemical structure should give a solution containing large percentages of the acidic component: that is, a high solids content is preferable as being less subject to flow when applied in the cold, and requiring less time at elevated temperature for expulsion of the solvent. Other solvents can be employed, including dimethylacetamide, methyl Cellosolve and other Cellosolves which produce solutions with the ethanolamine salt.

The invention can be practiced in many ways within the scope of the appended claims.

What is claimed is:

1. A solder flux consisting for the active fluxing component of an organic acid compound selected from the group consisting of dicarboxylic saturated aliphatic acids having 9 to 10 carbon atoms with at least 4 carbon atoms in chain between the carboxylic groups, trimellitic acid, the anhydrides of said acids and the esters of said acids with primary aliphatic alcohols and with aliphatic glycols, and hydroxybenzophenones having two nuclei connected through a single carbonyl group and having a hydroxyl group on one nucleus in ortho position relative to the carbonyl attachment to said nucleus, and having as an additional ingredient 2 to 50% by weight of ethanolamine hydrochloride on the basis of the weight of said acid compound.

2. A solder flux consisting for the active fluxing component of normal sebacic acid, said acid present in solution in a volatile organic solvent, said solution containing 2 to 50% by weight of ethanolamine hydrochloride on the basis of the weight of said normal sebacic acid.

3. A solder flux consisting for the active fluxing component of azelaic acid, said acid being present in solution in a voltatile organic solvent, said solution containing 2 to 50% by weight of ethanolamine hydrochloride on the basis of the weight of said azelaic acid.

4. A solder flux consisting for the active fluxing component of trimellitic acid, said acid being present in solution in a voltatile organic solvent, said solution containing 2 to 50% by weight of ethanolamine hydrochloride on the basis of the weight of said acid.

5. A solder flux consisting for the active fluxing component of an organic acid compound selected from the group consisting of dicarboxylic saturated aliphatic acids having 9 to 10 carbon atoms with at least 4 carbon atoms in chain between the carboxylic groups, trimellitic acid, the anhydrides of said acids and the esters of said acids with primary aliphatic alcohols and with aliphatic glycols, and hydroxybenzophenones having two nuclei connected through a single carbonyl group and having a hydroxyl group on one nucleus in ortho position relative to the carbonyl attachment to said nucleus, and having as an additional ingredient approximately 5% by weight of ethanolamine hydrochloride on the basis of the weight of said acid compound.

6. A solder flux consisting for the active fluxing component of sebacic acid, said acid present in an amount of about 25 parts by weight in solution with approximately 75 parts by weight of dimethylformamide, said solution having therein approximately 5% by weight of ethanolamine hydrochloride on the basis of the weight of said sebacic acid as a filleting ingredient.

References Cited by the Examiner

UNITED STATES PATENTS

| 1,785,135 | 12/1930 | McQuaid | 148—23 |
| 1,949,916 | 3/1934 | McQuaid | 148—23 |
| 2,563,391 | 8/1951 | Browne | 148—23 |
| 2,659,684 | 11/1953 | Neish | 148—23 |

DAVID L. RECK, *Primary Examiner.*

WINSTON A. DOUGLAS, *Examiner.*